United States Patent [19]

Spencer

[11] 4,335,086
[45] Jun. 15, 1982

[54] HYDROXYAPATITE AND ITS PREPARATION

[76] Inventor: Michael Spencer, 34 Bayham Rd., Sevenoaks, Kent, United Kingdom,

[21] Appl. No.: 190,883
[22] PCT Filed: Jul. 17, 1979
[86] PCT No.: PCT/GB79/00118
§ 371 Date: Mar. 21, 1980
§ 102(e) Date: Jan. 25, 1980
[87] PCT Pub. No.: WO80/00247
PCT Pub. Date: Feb. 21, 1980

[30] Foreign Application Priority Data

Jul. 21, 1979 [GB] United Kingdom ............... 30646/78

[51] Int. Cl.$^3$ ............................................. C01B 25/32
[52] U.S. Cl. ..................................... 423/308; 423/311
[58] Field of Search ................................. 423/308, 311

[56] References Cited

U.S. PATENT DOCUMENTS 3,737,516  6/1973  Jenner .................................. 423/308
4,046,858  9/1977  Barsa et al. ......................... 423/311
4,139,599  2/1979  Tomlinson et al. ................ 423/308

FOREIGN PATENT DOCUMENTS 413346  7/1934  United Kingdom .

OTHER PUBLICATIONS

Main et al., "A Modified Calcium Phosphate for Column Chromatography of Polynucleotides and Proteins", Journal of the American Chemical Society, vol. 81, pp. 6490-6495 (1959).
Mazin et al., Anal. Biochem., vol. 61, pp. 62-70 (1974).
Journal of Physical Chemistry, vol. 77, No. 19 (1973), The American Chemical Society (Easton PA., U.S.A.). Boskey et al., "Conversion of Amorphous Calcium Phosphate to Microcrystalline Hydroxyapatite, A pH Dependent Solution-Mediated, Solid-Solid Conversion", pp. 2313-2317.

Primary Examiner—O. R. Vertiz
Assistant Examiner—Wayne A. Langel
Attorney, Agent, or Firm—Schwartz, Jeffery, Schwaab, Mack, Blumenthal & Koch

[57] ABSTRACT

Hydroxyapatite is prepared by heating an aqueous suspension of brushite without boiling at a substantially neutral pH. In this way, hydroxyapatite having rosette-shaped crystals can be prepared, having good flow rate when packed in a column or good resolution between elution peaks.

6 Claims, No Drawings

HYDROXYAPATITE AND ITS PREPARATION

This invention relates to the preparation of hydroxyapatite (HA). HA is of great utility in the chromatography of complex substances.

HA is a form of calcium phosphate and may be prepared from another form, brushite (CaHPO$_4$.2H$_2$O). For use, it is desirable that HA should be in crystalline form with a substantial uniformity in the size of the crystals and I believe that it is important to retain the gross morphology of the brushite from which HA is derived.

The basic method for the preparation of commercial HA is described by Tiselius et al, Arch. Biochem. and Biophys., 65 (1956) 132 and involves boiling brushite in an excess of NaOH. I have confirmed the observation of Jenkins, Biochem. Preparations, 9 (1962) 83, that the NaOH must be added before the heating is started; X-ray diffraction showed that boiling without alkali leads to a rapid partial conversion of brushite to other forms of calcium phosphate, as described by W. E. Brown et al, Nature, 196 (1962) 150, with disruption of the brushite morphology that is needed for an adequate flow rate when using the product. It can be demonstrated that, while heating in the presence of alkali, the material comprises a mixture of brushite and HA. In the Tiselius method, before the materials boils, at a temperature of 70°–80° C., observation indicates that the conversion to HA is complete but that the HA crystallites are still very small. Beyond this stage, titration of samples showed that there was little further incorporation of alkali. In order to obtain satisfactory crystallites, it is necessary to subject the product of the first boiling stage to repeated boiling in dilute phosphate buffer. Although it is possible to prepare HA from brushite by alkali treatment in the cold, the crystallites which are formed initially do not grow larger.

These observations suggest that the main effect of the boiling stages, recommended by Tiselius et al without explanation and followed by all authors since, is to ripen the HA crystallites to a size giving optimum binding strength. Although it has been stated that the final preparation contains incompletely converted brushite crystals, X-ray results do not support this, and the low Ca/P ratio of the Tiselius material compared with the stoichiometric value of 1.67 is now believed to be due to deficiencies in the lattice.

A shorter process for the preparation of HA is described by R. K. Main et al, J. Am. Chem. Soc, 81 (1959) 6490, but this still involves a period of boiling and there are numerous washing stages. Again, an increase in elution molarity and crystallite size on boiling can be observed, but in this case the Ca/P ratio changes very little. It is noteworthy that, at the start of the boiling period, this material gave stronger binding than Tiselius HA at a similar stage. Furthermore, X-ray diffraction showed that the conversion to HA proceeds differently. The method uses ammonia which is added continuously so as to maintain a pH of about 8. At a very early stage of the conversion, when the temperature had risen only to 50° C., I have observed, by X-ray diffraction, that the brushite is mixed not with HA but with octacalcium phosphate (OCP), Ca$_8$H$_2$(PO$_4$)$_6$.5H$_2$O. Amorphous material was also present, giving a high background. At later stages, the patterns showed HA mixed with a trace of OCP which finally disappeared.

This sequence of transitions has been reported by Brown et al, supra, but only in the absence of added alkali. OCP may be formed in the Tiselius procedure also, but the higher pH used there may make the OCP stage too transient for it to be recorded. It seems clear that a more rapid production of suitably sized HA crystallites is associated with a detectable OCP intermediate. However, the procedure of Main et al shares the disadvantage of the Tiselius method that prolonged boiling and washing can lead to a break-up of the massed crystallites with consequent reduction in flow rate. Further, when the system is boiled, "bumping" (which varies in extent with the apparatus employed) may occur and the process is not easy to control. Main et al prefer to use the volatile alkali ammonia; they report unsatisfactory results when using NaOH. Finally, even if a satisfactory flow rate is achieved with a known HA product, this is often due to the temporary formation of aggregates which break up when the product is packed in a column.

A modified calcium phosphate for chromatography has been marketed as "Spheroidal Hydroxyapatite", but analysis suggests that the product is another form of calcium phosphate, viz. β-whitlockite. The material marketed as "Hypatite-C" is described as a form of hydroxyapatite but appears to be OCP.

British Patent Specification Nos. 413,346; 1,165,578 and 1,183,090 each disclose treating brushite by heating, but it is not suggested that boiling should be avoided or that the pH should be controlled. It is therefore likely that these treatments produce monetite, i.e. anhydrous CaHPO$_4$.

Hydroxyapatite can be prepared by the addition of alkali to brushite at room temperature. However, the product has small crystallites and is unsatisfactory for use in chromatography as its peak resolution is low.

A major problem with all known methods of brushite treatment, on a commercial scale, is the lack of reproducibility. It is important for a user of chromatographic materials to be confident that products marketed under a given name or even by a given process are substantially identical, and this has hitherto not been the case. This problem has been recognised by Kothari et al, J. Chromatogr., 98 (1974) 449 who stated that "hydroxyapatite is prepared under empirical conditions, which are often critical, and the whole procedure needs considerable familiarity. The preparation itself is laborious and not completely standardised and therefore it may not be possible to prepare the adsorbent repeatedly with comparable chromatographic characteristics." It would therefore be desirable to provide a process for producing hydroxyapatite in which not only does the product have inherently good characteristics, but also the process is reproducible.

According to the present invention, a process for preparing hydroxyapatite comprises heating an aqueous suspension of brushite without boiling at a pH which is substantially neutral. The process of the invention allows the morphology of the brushite to be maintained. The hydroxyapatite can have rosette-shaped crystals which, when packed in a column for chromatography purposes, can give excellent flow rates which are superior to those of known HA products.

The process of the invention has three main advantages over those described in the prior art. Firstly, it is reproducible. Secondly, it is unnecessary to wash out excess alkali at the end of the preparation. Thirdly, and perhaps most importantly, there is a rapid production of large HA crystallites, without extensive boiling and changes of buffer. This third factor appears to arise because the production of an OCP intermediate is more pronounced that at higher pH values. This has been illustrated by adding ammonia to a hot suspension of brushite. X-ray diffraction shows that the first change is from brushite to OCP, and that the OCP intermediate is better crystallised than at pH 8. Later, although there is still a strong OCP component, all brushite spots have disappeared and the 8.2 A spacing of HA is prominent. The final preparation showed only HA.

In agreement with the conclusion reached above, it was found that the binding strength of the product for tRNA could be further increased by incubation at high temperature, without resorting to boiling. Incubation is preferably carried out at 60 to 95, e.g. 65° to 90° C.

The process of the invention should be carried out until there is substantially only HA present. In fact, when this stage has been reached, the system may be boiled to increase the resolution between peaks of an elution profile, with a further small increase in crystallite size and tRNA elution peak.

I have found that the method used to make brushite influences the HA end product in several ways; for instance the flow rate after conversion depends critically on the morphology of the brushite. In the Tiselius method, the brushite is made by mixing equal streams of 0.5 M solutions of $CaCl_2$ and $NaHPO_4$. This was found to give clusters of brushite plates whose longest dimension was about 100 $\mu$m. However, this material was found by X-ray diffraction to contain a small proportion of OCP which rendered it unsuitable for conversion to HA at neutral pH; it gave an excessive early production of OCP, nucleated by the pre-existing OCP, and conversion to HA was inhibited. When converted to HA by the usual Tiselius method, this brushite also tended to break up and give an unacceptably low flow rate. Preferably, therefore, the brushite preparations are made by the method of Main et al, supra, in which a $CaCl_2$ solution is added to an excess of sodium phosphate.

In this method the pH of the phosphate solution was found to determine the chemical composition of the end product; at pH values above neutrality the first precipitate was OCP, with increased production of brushite as the pH fell during mixing. With an initial pH of 9.5 (that of $Na_2HPO_4$), the end product contained an appreciable proportion of OCP and its flow rate was very low. At initial pH values below neutrality the material was entirely brushite and the flow rate much higher, but the yield was lower because of the cessation of crystallisation at low pH. I have found that brushite may conveniently be made with an initial phosphate pH of 6.7, which yielded approximately 50% of the available calcium in the form of brushite. This material invariably gave the diffraction pattern of $CaHPO_4.2H_2O$ and not that of the anhydrous form.

Attempts to increase the yield by simultaneous addition of alkali to maintain constant pH were not promising; the crystal clusters were very dense, and they tended to break up on conversion to HA. The "unregulated" pH 6.7 preparation gave a final pH of about 3.2, and this seemed to favour the production of suitably thin plates of brushite.

A most important variable in this method is the degree of seeding. Apparatus used repeatedly without cleaning acquired a deposit of brushite which gave seeding that increased with time, while rigorous cleaning gave a delayed start to crystallisation. For reproducible production of uniform crystal clusters it was found best to add to the phosphate solution a portion of brushite previously ground in a mortar; this gave a reproducibly high flow rate suitable for large columns. Over-seeding gave excessively large clusters with a lower elution molarity after conversion. HA made from seeded brushite gave a poor resolution between peaks when used with gradient elution in smaller columns (eg. 10×150 mm); for such applications it was preferable to make brushite without seeding to obtain larger, less clustered crystals. The converted HA could also be boiled for a limited period to reduce further the effective particle size.

If, in the process of the invention, the pH falls below neutrality the favoured reaction (at 70°-80° C.) is conversion to OCP rather than HA. By adding alkali at a reduced rate so as to keep the pH at about 6, OCP alone can be produced. The reaction can be written as follows:

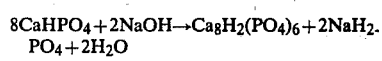

$$8CaHPO_4 + 2NaOH \rightarrow Ca_8H_2(PO_4)_6 + 2NaH_2PO_4 + 2H_2O$$

and uses 0.25 moles of alkali per mole of brushite. Addition of a further 0.35 moles of alkali to a neutral endpoint can give conversion to HA, $Ca_{10}(PO_4)_6(OH)_2$, with release of more phosphate. However, once OCP has formed large crystallites this reaction appears to be slow.

Nucleation of OCP is inhibited below pH 6, but once crystallisation begins it proceeds rapidly and, in the absence of added alkali, the pH falls to about 4 before the reaction ceases. This reaction explains the observation of a drastic physical change when brushite is added to water at 80°-100° C. (0.05 gram ions Ca in 500 ml); although the proportion of OCP produced in the absence of added alkali is very small, the very thin crystals produced gave a five-fold increase in settled colume and a large reduction in flowrate.

Accordingly, in the process of this invention, the pH should not be less than 6 but, in general, it is preferred to maintain the pH at from 7 to 7.5. Usually the pH is kept below 7.25. In the process of the invention, it is necessary to add an alkali to the solution or suspension of brushite in order to bring the system to the desired pH. The nature of the alkali is not critical. An alkali metal hydroxide, e.g. sodium hydroxide, is the preferred alkali for this purpose, although ammonia may also be used.

The temperature at which, in the process of this invention, the aqueous suspension of brushite is heated is above room temperature (25° C.) and is usually above 40° C., preferably above 50° C., more preferably above 60° C. and most preferably above 70° C. The temperature will usually be maintained at or below 100° C. e.g. below 95° C. (at atmospheric pressure).

It is believed to be a particularly advantage of the present invention that the product can have rosette-shaped crystals. Such crystals provide good storage stability and good resistance to freeze-drying. Further, they ensure good flow rates. By "rosette-shaped", I mean that a crystal, when viewed in a light microscope, does not comprise a number of thin plates but has a central portion surrounded by a number of angularly spaced petals. The number of petals in each rosette will be determined by the morphology of the brushite and by the degree of seeding; it is preferably at least 4 or 6

(in plan) for optimum flow rate. An example of hydroxyapatite of this invention having good flow rate is shown in part c of the accompanying photographs where the rosette configuration can be clearly seen.

The product of this invention preferably has a characteristic flow rate of at least 30, usually at least 40, more preferably at least 45, and most preferably at least 50 ml/hour. This is preferably in combination with a weight-specific binding capacity for bovine serum albumin (BSA) of at least 30, preferably at least 40 mg/g and a tRNA elution peak of at least 0.06, preferably at least 0.08 Molar.

I have found that it is impossible to achieve both optimum flow rate and optimum resolution between the peaks of an elution profile, in the same preparation of HA. Homogeneity of packing of the product HA in a chromatographic column, as tested with a methyl orange maker, was no guarantee of resolution between peaks, and although this could be slightly improved by restricting the flow rate and increasing gradient volumes, there appeared to be no substitute for reducing effective particle size.

Three variants of HA production in accordance with this invention have therefore been developed: (i) a very high flow rate preparation (HF) suitable for batch fractionations and gradient elution from columns of diameter exceeding 15 mm; (ii) a general-purpose preparation (GP) of intermediate properties; and (iii) a high resolution preparation (HR) having a lower flow rate.

The X-ray diffraction data referred to in this specification were obtained from photographic records of powder diffraction obtained with CuKa radiation from a microfocus generator fitted with a graphite monochromator, feeding a cylindrical camera of diameter 58 mm with a 0.5 mm collimator. Powdered calcite was used for calibration. Samples taken from different stages of a preparation were neutralised and washed to arrest chemical changes, or simply pipetted directly onto a pad of filter paper. Samples were dried at a temperature not exceeding 85° C. (to avoid heat-induced changes) and were mounted in glass capillaries.

Flow rates were measured at room temperature with a $9 \times 75$ mm bed under a pressure head of 250 mm. Determination of tRNA elution profiles were made at 5° C. with a column of bore 9 mm and length 150 mm loaded with 2 mg tRNA, eluted with a linear gradient of 0 to 0.2 M sodium phosphate buffer, pH 7.0, total volume 120 ml. Calcium was determined by EDTA titration and phosphorus by the molybdenum blue reaction.

Binding capacities were measured for bovine serum albumin fraction V (BSA), tRNA from *E. coli* K12 CA265 and a high molecular weight double-stranded DNA. HA samples of 25 mg or more were dispersed in 5 ml 0.05 M sodium cacodylate buffer adjusted to pH 6.8±0.1. Concentrated stock solutions were then added to give values of 0.4%, 0.2% and 0.01% for BSA, tRNA and DNA, respectively. The mixtures were gently agitated for 30 min at room temperature and then pelleted. Solute bound was estimated from the optical destiny of the supernatant, subtracting any absorbance measured in blank containing no solute. Extinction coefficients ($E_{1\,cm}^{1\%}$) were assumed to be 6.6 for BSA at 280 mm and 200 for tRNA and DNA at 260 mm. The amount of HA added was adjusted in successive experiments until the ratio of free to bound solute lay between 1.5 and 5.0; below 1.5 the binding decreased, while above 5.0 the accuracy deteriorated. With suitable precautions against volumetric errors (particularly necessary with cold, viscous stock solutions), a reproducibility of ±10% was obtained.

The following Examples illustrate the invention.

EXAMPLE 1

Brushite 2.0 liters of 0.5 M $CaCl_2$ were added at 50 ml/min to 2.4 liters of 0.5 M sodium phosphate buffer, pH 6.7. Mixing was in a 9 l. bucket with a bath recirculator (B. Braun, Melsungen, W. Germany) having an impeller pump; the $CaCl_2$ was fed through a tube ending above the impeller orifice. For high flow rate (HF) preparations, the supply voltage was reduced to 130 V to give a circulation rate of about 6 l/min, and 1.0 g brushite seed powder was added to the phosphate solution before starting. Seed material was made by grinding a wet paste of brushite in a mechanical pestle and mortar until the particle size was about 3 µm; it was either stored at 5° C. as a wet suspension, or dried at 85° C. and kept in a desiccator. For general purpose (GP) and high resolution (HR) preparations no seed was added, and before starting the apparatus was cleaned by washing briefly in 0.1 N HCl. The mixer was in this case run at full voltage but the impeller orifice was reduced to half its full horizontal extent, giving a circulation rate of about 4 l/min; this helped to break up crystal clusters. For the HF preparation, the brushite was in the form of stellate clusters of plates of length up to 40 µm and thickness 1' µm; its flow rate was 60–150 ml/h. For the GP and HR preparations, the brushite contained more isolated plates and their length was up to 70 µm.

After mixing, the crystals were allowed to settle and washed in 5 l. distilled water to remove soluble salts. Settled volumes were about 500 ml for type HF and 700 ml for GP and HR.

EXAMPLE 2

Hydroxyapatite

The brushite suspension prepared in Example 1 described above was transferred (after removing the supernatant) to a well-lagged 5 l. beaker fitted with a $50 \times 100$ mm paddle stirrer rotatable at 200 rpm. For HF material, 5 ml 0.5 N HCl were added to inhibit the formation of OCP in the next stage, which (for all types of preparation) was the rapid addition with stirring of 2.5 l. boiling distilled water. The temperature was now 70°–75° C. and the pH 5.0–5.5. The stirrer was stopped and the sediment allowed to settle. The supernatant was removed by suction without delay and a further 5 ml 0.5 N HCl added to all preparations.

A further 2.5 l. boiling water were than added, followed by the addition of about 72 ml. 20% NaOH through a delivery tube reaching to the base of the beaker. The pH was monitored continuously using high-temperature electrodes with a platinum resistance thermometer, and the delivery rate of alkali was regulated (using a variable-speed peristaltic pump) so that the pH stayed at 7.0±0.2 after the first 0.5 min., during which there was an initial drop to 5.5–6.0 due to the rapid formation of OCP intermediate. Typical values of delivery rate (in ml/min) were as follows: 0–0.5 min, 35; 0.5–1 min, 50; 1–2 min, 30. During this time the temperature fell by about 6 C. degrees from an initial value of 85°–90° C. Delivery was stopped when the pH stayed steady at 7.2.

After the sediment had been allowed to settle and the supernatant removed, the material was washed twice in 2.5 l. aliquots of boiling water. After the final resuspension, the beaker was covered and transferred without removal of supernatant to an insulated cabinet, where it was allowed to cool slowly overnight; the initial rate was 0.3 C. deg/min. The settled volume was about 550 ml for type HF and 750 ml for types GP and HR. HR material was further treated by diluting a portion of sediment with an equal volume of water and boiling vigorously for 30 min on a hotplate equipped with a magnetic stirrer. Stirring was continued during cooling after removal from the hotplate.

The flow rate of HF preparation was 40–80 ml/h which is higher than for any commercial HA having comparable binding properties. The tRNA elution profile at 5° C. gave a peak at $0.100 \pm 0.005$ M sodium phosphate (pH 7.0); the resolution between peaks was poor with a $9 \times 150$ mm column but greatly improved with a $16 \times 900$ mm column. For maximum resolution, a still larger column would be required. The material could be stored at 5° C. as a wet suspension without change in properties. Samples placed for 24 h. at room temperature in an end-over-end shaker operating at 30 rpm showed no drop in flow rate. The material could be freeze-dried and reconstituted with water without loss of flow rate, but air-drying led to a large reduction if the resulting lumps were ground up.

The flow rate for the GP preparation was 20–40 ml/h both before and after conversion. The resolution was somewhat better than with type HF.

The flow rate for the HR preparation was 10–15 ml/h. The tRNA elution profile peaked at a slightly higher phosphate molarity, owing to the boiling stage, and gave much better resolution, than types GP and HF. Stability was similar to that of type HF. The binding capacities were about twice those of type HF.

The accompanying photographs show, for the purpose of illustration, under a light microscope with x16 objective using bright-field illumination and reduced aperture stop, crystals of the following:
 a: Brushite (HF preparation of Example 1).
 b: Brushite (GP and HR preparations of Example 1).
 c: HA (HF preparation of Example 2).
 d: HA (HR preparation of Example 2).

The following Table gives various results for various materials which are, or are related to, HA. Preparation 1 is brushite prepared by adding CaCl$_2$ slowly to a phosphate solution adjusted to pH 6.7 (Main et al, supra). Preparation 2 is monetite prepared by boiling brushite (Spencer, J. Chromatogr. 166 (1978) 435). Preparation 3 is HA prepared according to Tiselius, supra, but using the above brushite. Preparations 4 and 5 are commercial HA samples made by the Tiselius method: respectively Bio-Rad HTP (control 13879) and DNA-HTP (control 13621). Preparations 6 and 7 represent a small-scale run (the flow rate of a second experiment is bracketed) and one commercial product (BDH HA lot 1751110) of the Main et al method of preparing HA. Preparations 8 and 9 are HA may be alkaline conversion (KOH and NaOH, respectively) of the above brushite at room temperature (Siegelman et al, Anal. Biochem. 13 (1965) 402). Preparations 10 to 12 are products of this invention, respectively using NH$_3$ and the HF and HR methods exemplified above. Preparations 13 and 14 are samples of HA prepared by direct precipitation, of the type intended for use in the study of tooth and bone growth (Blumenthal et al, Calcif. Tiss. Res. 13 (1973) 235). Preparation 15 is Hypatite-C which, as discussed above, appears to be OCP (from its diffraction pattern). Preparation 16 is OCP obtained by treating brushite with insufficient alkali. Preparation 17 is "Spheroidal Hydroxyapatite" which, as discussed above, appears to be β-whitlockite.

It should be noted that the two runs of preparation 6 show that the flow rate for the method of Main et al is far from reproducible. The molar Ca/P rates for all the above preparations of HA were within the range of 1.49 to 1.62.

The data in the following Table can also be found in Spencer et al, J. Chromatogr. 166 (1978) 426.

| Prep. No. | Weight-specific binding capacity (mg/g) | | | tRNA profile peak (M) | Flow-rate (ml/h) |
|---|---|---|---|---|---|
| | BSA | tRNA | DNA | | |
| 1 | <1 | <1 | 0.4 | <0.01 | 40 |
| 2 | 5 | 3 | 0.9 | 0.050 | 12 |
| 3 | 49 | 30 | 2.0 | 0.090 | 12 |
| 4 | 55 | 32 | 1.6 | 0.096 | 17 |
| 5 | 53 | 33 | 1.7 | 0.109 | 2 |
| 6 | 78 | 46 | 2.7 | 0.097 (0.085) | 6 (28) |
| 7 | 50 | 34 | 1.2 | 0.105 | 6 |
| 8 | 53 | 33 | 2.7 | 0.042 | 14 |
| 9 | 31 | 20 | 3.3 | 0.050 | 15 |
| 10 | 55 | 36 | 2.4 | 0.098 | 34 |
| 11 | 46 | 26 | 2.4 | 0.102 | 52 |
| 12 | 90 | 51 | 4.2 | 0.108 | 11 |
| 13 | — | 44 | — | — | 1 |
| 14 | 57 | 28 | 3.6 | 0.085 | <1 |
| 15 | 68 | 42 | 0.5 | 0.048 | 100 |
| 16 | 22 | 12 | 3.9 | 0.056 | 49 |
| 17 | 2 | 1 | 0.1 | <0.01 | 49 |

I claim:
1. A process for preparing hydroxyapatite, comprising the steps of
 (a) adding an aqueous solution of CaCl$_2$ to an excess of sodium phosphate to produce an aqueous suspension of brushite;
 (b) heating the aqueous suspension of brushite from step (a) at a temperature of between 60° and 95° C. and maintaining the pH of the heated system at from 6 to 7.5 by the addition of alkali to produce hydroxyapatite or a mixture of hydroxyapatite and octacalcium phosphate; and
 (c) if octacalcium phosphate is present in the product of step (b), converting the octacalcium phosphate to hydroxyapatite by the further addition of alkali.

2. A process according to claim 1, wherein the pH of the heated system is maintained at from 7 to 7.5, and the product is free of octacalcium phosphate.

3. A process according to claim 1 or claim 2 wherein said sodium phosphate is admixed with brushite seed particles.

4. A process according to claim 1 or claim 2 wherein the aqueous suspension of brushite which is heated in step (b) is essentially free of octacalcium phosphate.

5. A process according to claim 1 further comprising the additional step of boiling the hydroxyapatite-containing aqueous system.

6. Essentially pure hydroxyapatite characterised by the capability of allowing a flow rate of from 40 to 80 ml/hour at room temperature in a $9 \times 75$ mm bed under a pressure head of 250 mm; a molar Ca/P ratio of from 1.49 to 1.62; a weight-specific binding capacity for bovine serum albumin of at least 30 mg/g; and a tRNA elution peak of at least 0.06 molar.

* * * * *